US010106329B2

(12) United States Patent
Brunone

(10) Patent No.: US 10,106,329 B2
(45) Date of Patent: Oct. 23, 2018

(54) TROLLEY FOR TRANSPORTING A BELT CONVEYOR, MOBILE CONVEYING FACILITY COMPRISING SUCH A TROLLEY, AND ASSOCIATED SHIFTING METHOD

(71) Applicant: René Brunone, Saint-Marcel (FR)

(72) Inventor: René Brunone, Saint-Marcel (FR)

(*) Notice: Subject to any disclaimer, the term of this patent is extended or adjusted under 35 U.S.C. 154(b) by 0 days.

(21) Appl. No.: 15/529,514

(22) PCT Filed: Nov. 23, 2015

(86) PCT No.: PCT/EP2015/077370
§ 371 (c)(1),
(2) Date: Jun. 15, 2017

(87) PCT Pub. No.: WO2016/083308
PCT Pub. Date: Jun. 2, 2016

(65) Prior Publication Data
US 2018/0111766 A1  Apr. 26, 2018

(30) Foreign Application Priority Data

Nov. 27, 2014  (FR) .................................. 14 61580

(51) Int. Cl.
B65G 21/12  (2006.01)
E21F 13/08  (2006.01)
(Continued)

(52) U.S. Cl.
CPC ........... B65G 41/008 (2013.01); B65G 21/02 (2013.01); B65G 21/12 (2013.01); E21F 13/08 (2013.01); B65G 15/08 (2013.01)

(58) Field of Classification Search
CPC ...... B65G 41/008; B65G 21/02; B65G 21/06; B65G 21/12; B65G 41/007; B65G 15/08; E21F 13/08
See application file for complete search history.

(56) References Cited

U.S. PATENT DOCUMENTS 3,612,257 A    10/1971  Hans et al.
4,139,087 A *   2/1979  Westhoff ................ B65G 21/10
                                                                198/309

(Continued)

FOREIGN PATENT DOCUMENTS

FR    2834501 A1 *  7/2003  ............ B65G 21/04
FR    3001447 A1    8/2014
JP    60-81917 U    6/1985

OTHER PUBLICATIONS

FR Patent Application No. 14-61580, Rapport de Recherche Preliminaire, Jul. 23, 2015, 2 pages.
(Continued)

Primary Examiner — Mark A Deuble
(74) Attorney, Agent, or Firm — Soquel Group LLC

(57) ABSTRACT

A trolley intended to transport a belt conveyor, including a loading station for loading support posts on the trolley, an unloading station for unloading the support posts off the trolley, a guiding structure for guiding the support posts from the loading station to the unloading station, and means for moving the trolley along a movement direction forming an angle with an axis connecting the loading and unloading stations.

13 Claims, 6 Drawing Sheets

(51) Int. Cl.
*B65G 21/02* (2006.01)
*B65G 41/00* (2006.01)
*B65G 15/08* (2006.01)

(56) References Cited

U.S. PATENT DOCUMENTS

| | | | | |
|---|---|---|---|---|
| 4,206,840 A | * | 6/1980 | Hanson | B65G 41/008 |
| | | | | 198/301 |
| 4,472,101 A | * | 9/1984 | Matheson | A01G 25/09 |
| | | | | 414/745.5 |
| 4,538,722 A | * | 9/1985 | Sumner | B65G 41/008 |
| | | | | 104/7.1 |
| 5,562,194 A | | 10/1996 | Wüsten | |
| 2003/0010600 A1 | | 1/2003 | Speers et al. | |
| 2014/0190788 A1 | * | 7/2014 | Finatzer | B65G 17/02 |
| | | | | 198/300 |
| 2015/0075949 A1 | * | 3/2015 | Whelan | B65G 15/60 |
| | | | | 198/813 |
| 2016/0115791 A1 | * | 4/2016 | Oberdorfer | B65G 21/14 |
| | | | | 198/812 |
| 2018/0029801 A1 | * | 2/2018 | Dampfhofer | B65G 41/008 |

OTHER PUBLICATIONS

PCT Patent Application No. PCT/EP2015/077370, International Search Report, dated Feb. 22, 2016, 6 pages.

\* cited by examiner

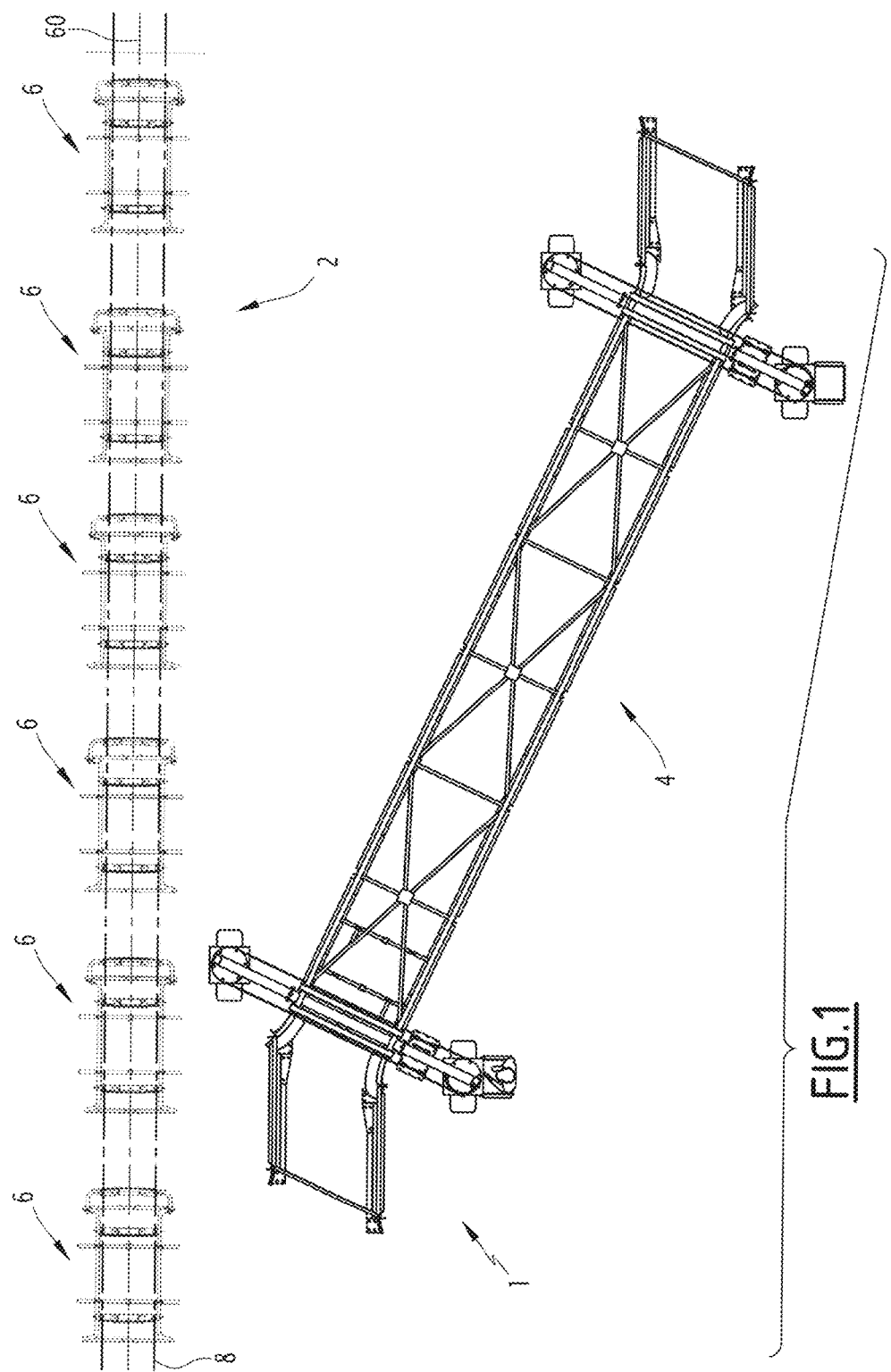

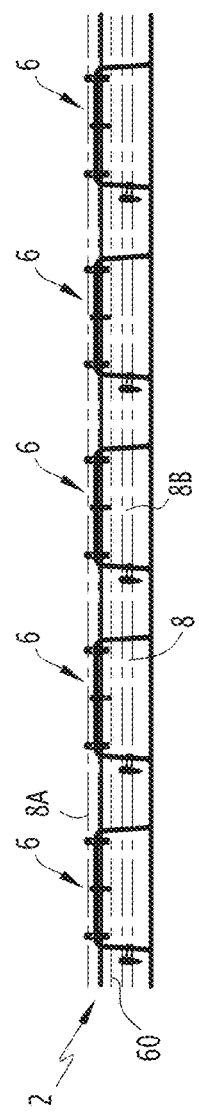
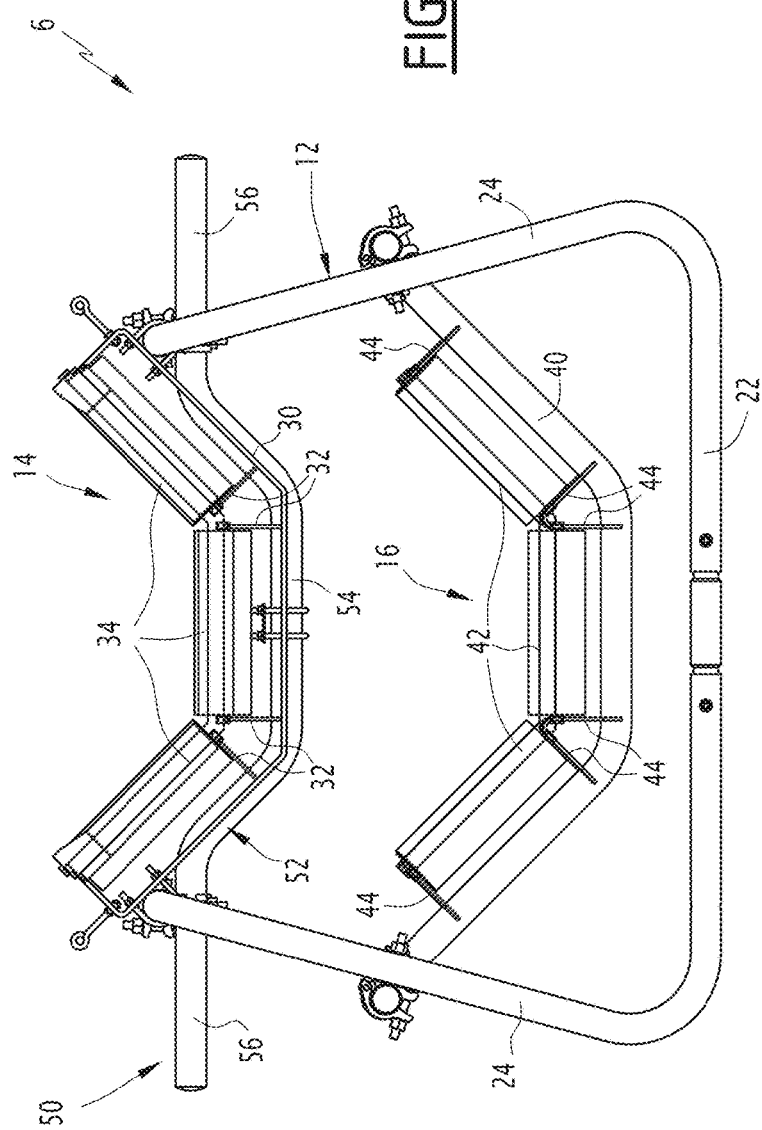

TROLLEY FOR TRANSPORTING A BELT CONVEYOR, MOBILE CONVEYING FACILITY COMPRISING SUCH A TROLLEY, AND ASSOCIATED SHIFTING METHOD

CROSS-REFERENCES TO RELATED APPLICATIONS

This application claims priority benefit under 35 U.S.C. § 371 to International Patent Application No. PCT/EP2015/077370 entitled TROLLEY FOR TRANSPORTING A BELT CONVEYOR, MOBILE CONVEYING FACILITY COMPRISING SUCH A TROLLEY, AND ASSOCIATED SHIFTING METHOD, and filed by inventor René Brunone on Nov. 23, 2015. International Patent Application No. PCT/EP2015/077370 claims priority to French Patent Application No. 14 61580, filed by inventor René Brunone on Nov. 27, 2014.

FIELD OF THE INVENTION

The present invention relates to the shifting of belt conveyors of the type comprising a set of independent support posts, suitable for resting on the ground and positioned successively along the length of the conveyor, and a conveyor belt supported by said support posts.

BACKGROUND OF THE INVENTION

In open-cast ore mining, the ore is collected over a large surface requiring the implementation of means for conveying the ore to a storage or vehicle loading point.

It is known to provide a facility for conveying ores on the mining site. The latter commonly includes a first conveyor, called collector, positioned along an edge of the mined area. This first conveyor is stationary for the entire mining period of the zone.

A second conveyor is positioned transversely to the first conveyor. This second conveyor passes all the way through the mined area. This conveyor is suitable for transferring the materials collected from the ground toward the first conveyor, above which its release end emerges.

In order to allow mining of the entire area to be mined, the second conveyor is movable, along the length of the first conveyor, so as to find itself in the current mining region. This second conveyor is generally moved transversely to its conveying direction.

It is known that the second conveyor includes a series of support posts distributed along the length of the conveyor belt of the conveyor. These support posts are independent and provide support for the conveyor belt.

In order to allow the second conveyor to shift by several meters transversely along its conveying direction, the support posts are most often connected to one another by a longilineal link positioned along the length of the second conveyor.

To ensure the shifting of each of the stations successively along the length of the second conveyor, a vehicle stressing the link transversely to its elongation direction is moved along the length of the second conveyor. This vehicle, for example made up of a construction vehicle with tracks, includes a member for receiving the link rigidly connected to the vehicle. This member grips the link. It is moved along the length of the link while forcing the link to shift gradually by several meters perpendicular to the conveying direction of the second conveyor.

A conveying facility of this type is for example known from FR-A-2,834,501.

However, such conveying facilities are not fully satisfactory. Indeed, each time the vehicle moves, the second transporter is only moved transversely by several meters, which requires circulating the vehicle many times from one end of the second conveyor to the other when the conveyor must be moved over a large distance. This results in unavailability of the conveyor over a significant length of time, which may have negative consequences on the production of the ore mine.

SUMMARY

One aim of the invention is to facilitate moving the conveyor, and in particular to make moving the conveyor over long distances less time-consuming and tedious.

To that end, the invention relates to a trolley for transporting a belt conveyor of the aforementioned type, comprising a loading station for loading the support posts on the trolley, an unloading station for unloading the support posts off the trolley, a guiding structure for guiding the support posts from the loading station to the unloading station, and means for moving the trolley along a movement direction forming an angle with an axis connecting the loading and unloading stations.

Such a trolley is particularly advantageous inasmuch as it does not merely stress the posts transversely to the conveying direction by pulling on the link connected to said posts, like in the state of the art, but makes it possible to handle the posts themselves and guide them to their destination. It is thus possible to move the posts, for each passage of the trolley along the conveyor, by a larger distance than in the state of the art.

According to specific embodiments of the invention, the trolley also has one or more of the following features, considered alone or according to any technically possible combination(s):

- the loading station comprises a rectilinear guide to guide the support posts from an inlet of the loading station to the guiding structure, said guide being suitable for being oriented substantially parallel to the movement direction during the movement of the trolley along the movement direction;
- the unloading station comprises a rectilinear guide to guide the support posts to an outlet of the unloading station to the guiding structure, said guide being suitable for being oriented substantially parallel to the movement direction during the movement of the trolley along the movement direction;
- the guide of the loading station and/or the guide of the unloading station comprises two guide rails spaced transversely apart from one another relative to the guiding direction of the guide, said rails defining a window between them emerging in a lower face of the loading station, the unloading station, respectively;
- the guiding structure comprises two guide rails spaced transversely apart from one another relative to the guiding direction of said structure, said rails defining a window between them emerging in a lower face of the guiding structure;
- the movement means comprise a set of wheels together defining a contact surface of the trolley with the ground, each wheel being mounted pivoting on the chassis of the trolley such that its orientation relative to the chassis can be changed, the wheels being suitable for being oriented parallel to one another along a same direction, said direction constituting the movement direction of the trolley;

a first pair of wheels is positioned at the interface between the loading station and the guiding structure, and a second pair of wheels is positioned at the interface between the unloading station and the guiding structure;

the wheels of each pair are mechanically connected to one another so as to be kept substantially parallel to one another.

The invention also relates to a movable conveying facility, comprising:

a belt conveyor including a set of independent support posts, suitable for resting on the ground and positioned successively along the length of the conveyor, and a conveyor belt supported by said support posts, and a transport trolley as defined above, for transporting said belt conveyor.

According to specific embodiments of the invention, the facility also has one or more of the following features, considered alone or according to any technically possible combination(s):

the belt conveyor includes a filiform flexible line to which the support posts are connected;

each support post comprises a frame defining a bearing surface of the post on the ground, and, away from said bearing surface, a cooperation member for cooperating with the trolley for loading of the post on the trolley and guiding of the post by the trolley;

the cooperation member comprises at least two rods spaced apart from one another along an elongation direction of the conveyor belt, each rod being oriented transversely to said elongation direction;

the distance of each cooperation member from the bearing surface is smaller than the distance of the guiding structure from a contact surface of the trolley with the ground.

The invention also relates to a method for moving a movable conveying facility as defined above, comprising the following steps:

moving the trolley parallel to an elongation direction of the conveyor belt, in a first sense, the loading station being transversely offset from a first side of the unloading station relative to the elongation direction of the conveyor belt, coming into contact of a support post of the conveyor with an inlet of the loading station, loading of the support post on the trolley, the support post being guided from the inlet of the loading station to the guiding structure, guiding of the support post from the loading station to the unloading station by the guiding structure, and unloading of the support post from the trolley, the support post being guided from the guiding structure to an outlet of the unloading station.

According to one particular embodiment of the invention, the method also comprises the following steps:

moving the loading station along a direction transverse to the elongation direction of the conveyor belt, the unloading station remaining substantially immobile, until the loading station is transversely offset from a second side of the unloading station relative to the elongation direction of the conveyor belt, moving the trolley parallel to the elongation direction of the conveyor belt, in a second sense opposite the first sense, coming into contact of a support post of the conveyor with the outlet of the unloading station, loading of the support post on the trolley, the support post being guided from the outlet of the unloading station to the guiding structure, guiding of the support post from the unloading station to the loading station by the guiding structure, and unloading of the support post from the trolley, the support post being guided from the guiding structure to an inlet of the loading station.

BRIEF DESCRIPTION OF THE DRAWINGS

Other features and advantages of the invention will appear upon reading the following description, provided solely as an example and done in reference to the appended drawings, in which:

FIG. 1 is a partial top view of a conveying facility according to the invention, FIG. 2 is a partial side view of a belt conveyor belonging to the conveying facility of FIG. 1, FIG. 3 is a front elevation view of a support post of the belt conveyor of FIG. 2.

DETAILED DESCRIPTION

Figure 4:
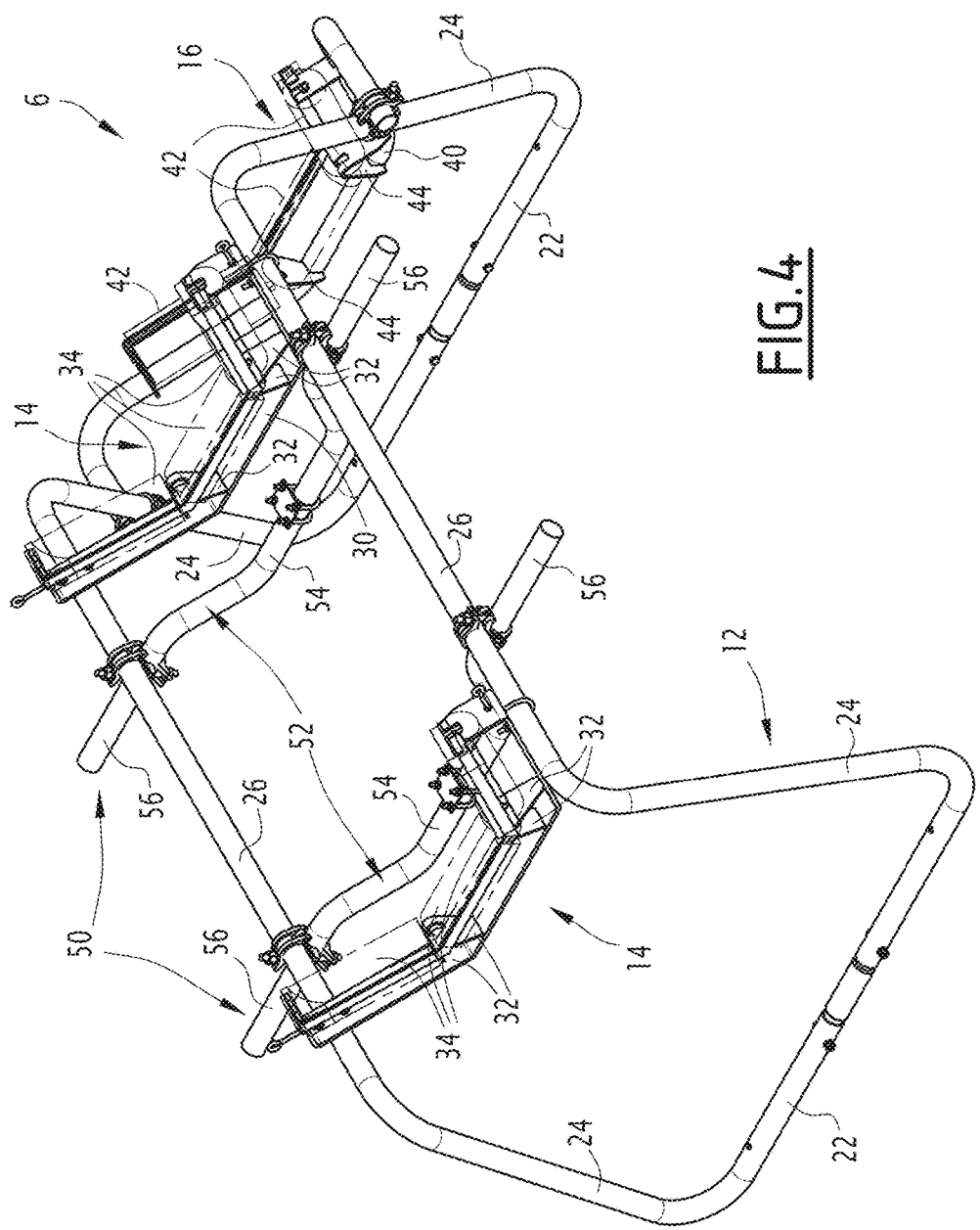
FIG. 4 is a three-quarters rear perspective view of the support post of FIG. 3.

FIG. 1 shows a movable conveying facility 1. This facility includes a belt conveyor 2 and a transport trolley 4 suitable for moving the conveyor 2 transversely when it moves along the length of the conveyor 2.

The conveyor 2 includes a set of independent support posts 6 positioned successively following one another, and a conveyor belt 8 supported by these posts 6. The belt 8 is shown in mixed lines in FIGS. 1 and 2 for greater clarity.

The conveyor belt 8 is folded at its longitudinal ends (not shown) to form a loop. This loop is maintained at each end by return cylinders (not shown) supported by end support posts (not shown), called conveyor foot and head. One of the return cylinders is rotated by a motor (not shown) to set the belt in motion around itself.

The belt 8 defines, as illustrated in FIG. 2, an upper line 8A for transporting products and a lower line 8B allowing the belt to return in the direction opposite the product conveying direction.

Each support post 6 has a length measured along the circulation direction of the belt comprised between 1 m and 2 m. Along the length of the conveyor, the support posts 6 are regularly distributed and are spaced apart, for example by 1 to 2 m.

In reference to FIGS. 3 and 4, each support post 6 includes a frame 12 suitable for resting on the ground, two guide cradles 14 for guiding the upper line 8A of the belt and a guide cradle 16 for guiding the lower line 8B of the belt.

The frame 12 is made up of a filiform framework. It includes two segments 22 bearing on the ground. These two segments 22 together define a bearing surface of the post 6 on the ground. They are extended, at their respective ends, by substantially vertical legs 24. The two legs 24 positioned on a same side of the belt 8 are connected to one another by a substantially horizontal longitudinal beam 26 supporting the upper guide cradles 14. These beams 26 each extend substantially parallel to the elongation direction of the belt 8.

The bearing segments 22 of each support post 6 extend substantially parallel to one another. They are symmetrical to one another relative to a median plane extending transversely to the elongation direction of the belt 8.

The bearing segments 22 and the associated legs 24 define an angle between them slightly smaller than 90°, this angle for example being equal to about 80°.

The angle formed between the legs 24 and the longitudinal beam 26 is slightly larger than 90°, and is for example equal to 95°.

The legs 24 generally converge toward one another each from their lower end connected to a bearing segment 22 to their upper end connected to a beam 26.

There are two upper cradles 14 guiding the belt 8 for each support post 6. They each extend transversely to the circulation direction of the belt 8 and are positioned near the ends of the frame 12. Each guide cradle 14 rests only on the two longitudinal beams 26. It is immobilized relative thereto.

More specifically, the upper guide cradles 14 each include a chassis 30 made up of a bent metal sheet extending, transversely relative to the elongation direction of the belt 8, from one longitudinal beam 26 to the other. The chassis 30 bears, on its upper surface, tabs 32 bearing three rotary rollers 34 positioned along the width of the chassis 30. The rollers 34 define a hollow bearing surface for the belt 8.

The lower cradle 16 is made up of a tubular support chassis 40 bearing three rotary rollers 42 supported by tabs 44. The ends of the support chassis 40 are connected to the legs 24, substantially in the median part of these legs 24.

Alternatively, only some support posts 6 include a guide cradle 16 for the lower line 8B of the belt 8. In particular, every other support post 6 is equipped with such a cradle 16.

According to the invention, each support post also includes, at a distance from the bearing surface of the post 6 on the ground, a cooperation member 50 for cooperating with the trolley 4 for loading of the post 6 on the trolley 4 and guiding of the post 6 by the trolley 4.

This cooperation member 50 includes two rods 52 spaced apart from one another along the elongation direction of the belt 8, each rod 52 being oriented transversely to said elongation direction. Said rods 52 are in particular inserted between the upper cradles 14.

Each rod 52 is connected to the frame 12, in particular to the two longitudinal beams 26.

Each rod 52 comprises a central segment 54, extending from one longitudinal beam 26 to the other, and two end segments 56, each extending from a longitudinal beam 26 toward the outside of the post 6.

The central segment 54 is centered, with a concave side oriented opposite the bearing surface on the ground, so as not to hinder the passage of the upper line 8A of the belt 8 between the upper cradles 14.

Each end segment 56 is rectilinear and extends substantially parallel to the bearing surface of the post 6 on the ground.

Returning to FIG. 1, the conveyor 2 is also equipped with a longilineal link 60 positioned along the elongation direction of the conveyor belt 8. This longilineal link 60 is connected to each support post 6. It is in particular attached to the middle of each rod 52 of the cooperation member 50 of each post 6.

This longilineal link 60 is made up of a filiform flexible line for example formed by a metal cable or a chain. The expression "filiform flexible line" refers to any line capable of being deformed easily and that has a low rigidity, such that the latter can for example be wound around itself.

Preferably, this filiform flexible line is made up of a cable.

This cable 60 is anchored at each of its ends so that the latter are immobilized relative to the ground. To that end, the ends of the cable are secured to moorings 10A, 10B (FIGS. 7 to 13) resting on the ground or piles pushed into the ground.

Furthermore, the cable 60 is kept tensed while being retained at both of its ends. This tension is such that the cable extends along a path having a large curve radius at each point and that has no lax zone of the cable. In particular, the cable is generally kept tensed between the successive support posts 6. To ensure its tension, the cable 60 is advantageously equipped with stretchers.

Figure 5:
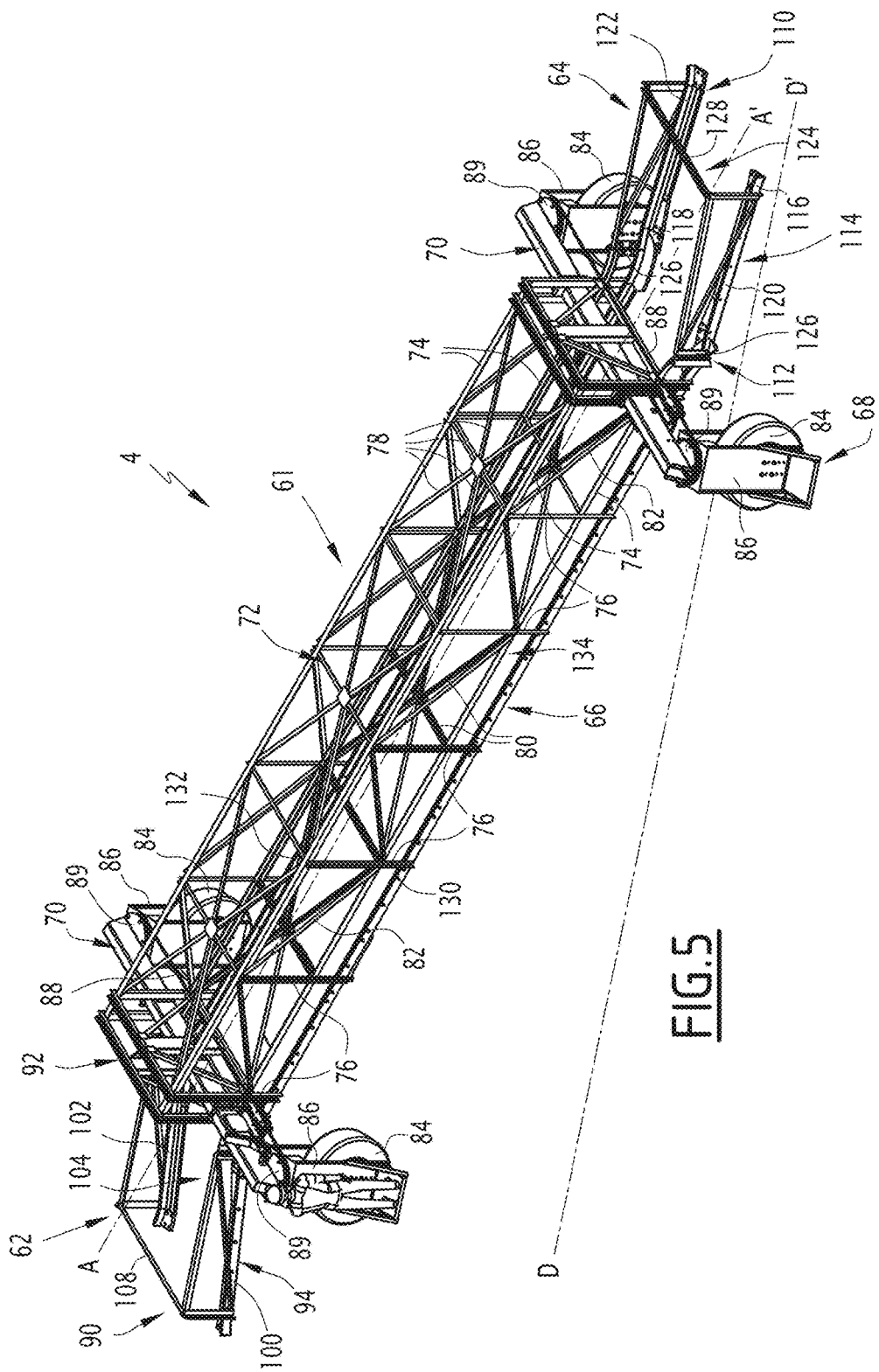
FIG. 5 is a three-quarters rear perspective view of a transport trolley belonging to the conveying facility of FIG. 1.
Figure 6:
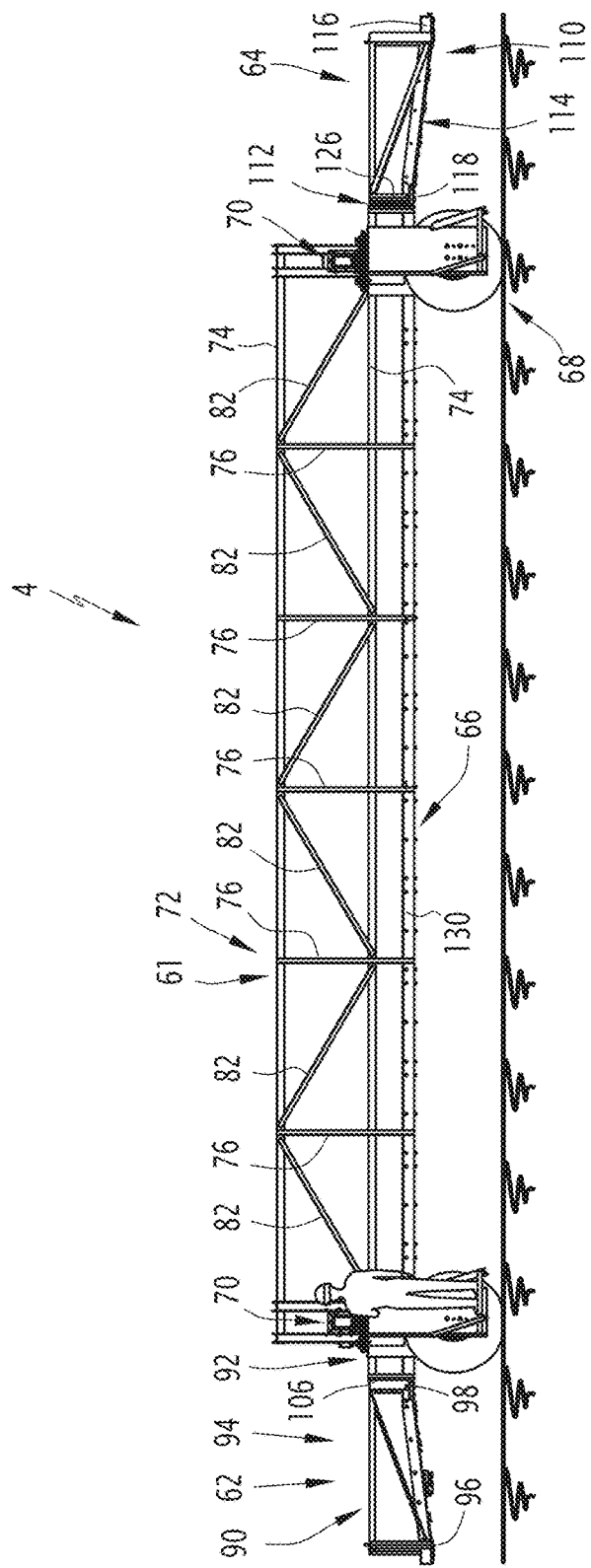
FIG. 6 is a side elevation view of the trolley of FIG. 5, and FIGS. 7 to 13 are schematic top views of the conveying facility of FIG. 1, during different steps of a method for moving the facility according to the invention.

In reference to FIGS. 5 and 6, the trolley 4 comprises a rigid chassis 61, a loading station 62 for loading the support posts 6 on the trolley 4, an unloading station 64 for unloading the support posts 6 off the trolley 4, a guiding structure 66 for guiding the support posts 6 from the loading station 62 to the unloading station 64, and means 68 for moving the trolley 4 along a movement direction D=D' forming an angle with an axis A-A' connecting the loading 62 and unloading 64 stations.

The chassis 61 is elongated along a longitudinal direction parallel to the axis A-A'. It comprises two end crosspieces 70 and, between the crosspieces 70, a core 72.

Each crosspiece 70 is formed by a tubular beam with a rectangular section. Each crosspiece 70 is positioned at the interface between the guide structure 66 and one of the loading 62 and unloading 64 stations.

The core 72 has a general parallelepiped shape. It comprises four stringers 74 defining four longitudinal parallel edges of the rhomb. It also comprises uprights 76 connecting the stringers 74 to one another aligned vertically with one another. It also comprises a plurality of intertwined upper beams 78 connecting the upper stringers 74 to one another, and a plurality of intertwined lower beams 80 connecting the lower stringers 74 to one another. The core 72 lastly comprises diagonals 82 extending from the intersection point of an upright 76 with an upper stringer 74 at the point of intersection of an adjacent upright 76 with the lower stringer 74 vertically aligned with said upper stringer.

Each upright 76 is extended downward past the lower stringer 74. Alternatively, only some uprights 76 extend downward past the lower stringer 74.

The core 72 is secured at its longitudinal ends to the crosspieces 70. Each crosspiece 70 protrudes transversely on either side relative to the core 72.

The movement means 68 comprise a plurality of wheels 84, four in the illustrated example, positioned at the end corners of the chassis 61. These wheels 84 together define a contact surface of the trolley 4 with the ground.

The wheels 84 are suitable for being oriented parallel to one another along a same direction, said direction constituting the movement direction D-D'. It will be noted that the orientation of each wheel 84 is defined as being the direction of the intersection of the plane perpendicular to the axis of the wheel 84 with the contact surface of the trolley 4 with the ground.

Each wheel 84 can be oriented relative to the chassis 61; in other words, each wheel 84 can be pivoted around an axis substantially perpendicular to the axis of the wheel 84 so as to change the orientation of said wheel 84. To that end, each wheel 84 is mounted pivoting on the chassis 61 via a yoke 86 framing the hinge pin (not shown) of the wheel 84, and said yoke 86 is mounted pivoting around a vertical axis, substantially perpendicular to the hinge pin of the wheel 84, at a transverse end of one of the crosspieces 70.

The wheels 84 comprise a first pair of wheels 84, positioned at the ends of the crosspiece 70 positioned at the interface of the guiding structure 66 and the loading stations 62, and a second pair of wheels 84, positioned at the end of the crosspiece 70 positioned at the interface of the guiding structure 66 and the unloading station 64. The wheels 84 of each pair are mechanically connected to one another so as to be kept parallel to one another. In the illustrated example, this mechanical connection is made up of an angle transmission chain 88, alternatively an angle transmission belt, connecting pulleys 89 each secured to a respective yoke 86 framing the axis of one of said wheels 84.

The loading station 62 comprises a first end 90 forming an inlet, a second end 92, opposite the first end 90, forming a connecting end to the guide structure 66, and, between said ends 90, 92, a rectilinear guide 94 to guide the sliding of the posts 6 from the inlet 90 to the connecting end 92.

The guide 94 is inclined upward from the inlet 90 toward the connecting end 92. In particular, the lower end 96 of the guide 94, at the inlet 90, is at a distance from the contact surface with the ground smaller than the distance of the end segment 56 of the rods 52 of the cooperation member 50 of each support post 6 from the bearing surface of said post 6 on the ground, and the upper end 98 of the guide 94, at the connecting end 92, is at a distance from the contact surface with the ground substantially equal to the distance of the guiding structure 66 from said contact surface.

The guide 94 comprises two guide rails 100, 102 substantially parallel to one another and spaced transversely apart from one another relative to the guiding direction of the guide 94. The distance between these rails 100, 102 is greater than the distance separating the longitudinal beams 26 of each station 6 from one another, while being smaller than the distance between the transverse ends of the cooperation member 50. Each rail 100, 102 thus defines, for each support post 6 received in the guide 94, a support surface for one of the end segments 56 of each rod 52 of the cooperation member 50 of said post 6.

The rails 100, 102 define a window 104 between them emerging in a lower face of the loading station 62; in other words, no element of the loading station 62 extends between the rails 100, 102, and the space between the window 104 and the contact surface of the trolley 4 on the ground is left free. The window 104 also emerges in the first and second ends 90, 92 of the loading station 62. Thus, the window 104 forms a passage for the support post 6 between the inlet 90 and the connecting end 92 of the loading station 62.

The guide 94 is suitable for being oriented substantially parallel to the movement direction D-D' during the movement of the trolley 4 along said direction D-D'. To that end, the guide 94 is mounted pivoting on the chassis 61 so as to be able to be oriented selectively parallel to the axis A-A' or along a direction forming an angle with said axis A-A'. In particular, hinges 106 are mounted transversely all the way through the connecting end 92, so as to allow each rail 100, 102 to pivot relative to the chassis 61 around a vertical axis, and a rod 108, oriented substantially parallel to a connecting direction of the hinges 106, is articulated to the rails 100, 102 at a distance from the hinges 106, so as to keep the rails 100, 102 substantially parallel to one another.

The unloading station 64 comprises a first end 110 forming an outlet, a second end 112, opposite the first end 110, forming a connecting end to the guide structure 66, and, between said ends 110, 112, a rectilinear guide 114 to guide the sliding of the posts 6 from the connecting end 112 to the outlet 110.

The axis A-A' connecting the loading 62 and unloading 64 stations to one another is defined as the axis connecting the middle of the connecting end 92 to the middle of the connecting end 112.

The guide 114 is inclined downward from the connecting end 112 toward the outlet 110. In particular, the lower end 116 of the guide 114, at the outlet 110, is at a distance from the contact surface with the ground smaller than the distance of the end segment 56 of the rods 52 of each support post 6 from the bearing surface of said post 6 on the ground, and the upper end 118 of the guide 114, at the connecting end 112, is at a distance from the contact surface with the ground substantially equal to the distance of the guiding structure 66 from said contact surface.

The guide 114 comprises two guide rails 120, 122 substantially parallel to one another and spaced transversely apart from one another relative to the guiding direction of the guide 114. The distance between these rails 120, 122 is greater than the distance separating the longitudinal beams 26 of each station 6 from one another, while being smaller than the distance between the transverse ends of the cooperation member 50. Each rail 120, 122 thus defines, for each support post 6 received in the guide 114, a support surface for one of the end segments 56 of each rod 52 of the cooperation member 50 of said post 6.

The rails 120, 122 define a window 124 between them emerging in a lower face of the unloading station 64; in other words, no element of the unloading station 64 extends between the rails 120, 122, and the space between the window 124 and the contact surface of the trolley 4 on the ground is left free. The window 124 also emerges in the first and second ends 110, 112 of the unloading station 64. Thus, the window 124 forms a passage for the support post 6 between the connecting end 112 and the outlet 110 of the unloading station 64.

The guide 114 is suitable for being oriented substantially parallel to the movement direction D-D' during the movement of the trolley 4 along said direction D-D'. To that end, the guide 114 is mounted pivoting on the chassis 61 so as to be able to be oriented selectively parallel to the axis A-A' or along a direction forming an angle with said axis A-A'. In particular, hinges 126 are mounted transversely all the way through the connecting end 112, so as to allow each rail 120, 122 to pivot relative to the chassis 61 around a vertical axis, and a rod 128, oriented substantially parallel to a connecting direction of the hinges 126, is articulated to the rails 120, 122 at a distance from the hinges 126, so as to keep the rails 120, 122 substantially parallel to one another.

The guiding structure 66 is positioned below the chassis 61. It is secured to the chassis 61 and is stationary relative thereto.

The guiding structure 66 is at a distance from the contact surface with the ground larger than the distance of the cooperation member 50 of each support post 6 from the bearing surface of said post 6 on the ground, in particular larger than the distance of the end segment 56 of the rods 52 of the cooperation member 50 from the bearing surface of said post 6 on the ground.

The guiding structure 66 is rectilinear and is oriented substantially parallel to the axis A-A'. It extends from the loading station 62 to the unloading station 64.

The guiding structure 66 comprises two guide rails 130, 132 substantially parallel to one another and spaced transversely apart from one another relative to the guiding direction of the guiding structure 66. The distance between these rails 130, 132 is greater than the distance separating the longitudinal beams 26 of each station 6 from one another, while being smaller than the distance between the transverse ends of the cooperation member 50. Each rail 130, 132 thus defines, for each support post 6 received in the guiding structure 66, a support surface for one of the end segments 56 of each rod 52 of the cooperation member 50 of said post 6.

Each rail 130, 132 is in particular vertically aligned with two stringers 74 of the chassis 61, and is fastened to the lower end of the uprights 76 connecting said two stringers 74 to one another.

The rails 130, 132 define a window 134 between them emerging in a lower face of the guiding structure 66; in other words, no element of the guiding structure 66 extends between the rails 130, 132, and the space between the window 134 and the contact surface of the trolley 4 on the ground is left free. The window 134 also emerges at the longitudinal ends of the guiding structure. Thus, the window 134 forms a passage for the support post 6 between the connecting end 92 of the loading station 62 and the connecting end 112 of the unloading station 64.

A method for moving the movable facility 1 will now be described in reference to FIGS. 7 to 13.

Figure 7:
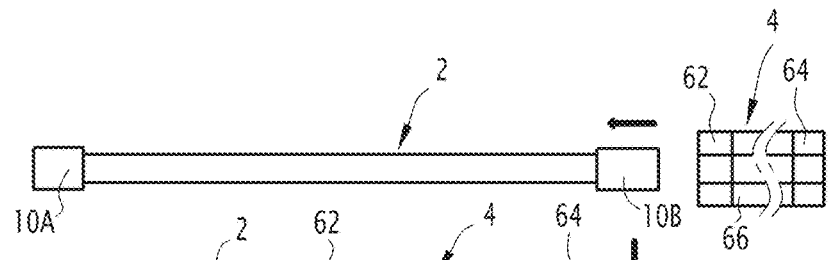

During a first step, shown in FIG. 7, the trolley 4 is positioned on the conveyor 2. To that end, the trolley 4 is placed next to the foot of the conveyor 2, aligned with the elongation direction of the belt 8, the guides 94, 114 of the loading 62 and unloading 64 stations being oriented substantially parallel to the axis A-A' and the wheels 84 being oriented such that the movement direction D-D' is substantially combined with the axis A-A'.

Then, the trolley 4 is moved toward the head of the conveyor 2, parallel to the elongation direction of the belt 8. In so doing, the support posts 6, beginning by the head of the conveyor 2, successively come into contact with the inlet 90 of the loading station 62. More specifically, the end segment 56 of the rods 52 of the cooperation member 50 of each station 6 come into contact with the lower end 96 of the guide 94.

The movement of the posts 6 along the elongation direction of the belt 8 being prevented by the longilineal link 60, and the trolley 4 moving along said direction, each station 6 thus slides along the guide 94 from the loading station 62 to the connecting end 92. The upper end 98 of the guide 94 being at a distance from the contact surface with the ground larger than the distance of the end segment 56 of the rods 52 of the cooperation member 50 of each support post 6 from the bearing surface of said post 6 on the ground, the bearing surface of said post 6 is brought away from the ground during the sliding of the post 6 along the guide 94.

Once the support post 6 has reached the connecting end 92, it continues to slide along the guiding structure 66 to the unloading station 64. The guiding structure 66 being at a distance from the contact surface with the ground larger than the distance of the end segments 56 of the rods 52 of each support post 6 from the bearing surface of said post 6 on the ground, the support post 6 does not touch the ground when it slides along the guiding structure 66, such that the sliding is done with minimal friction.

Once it has reached the connecting end 112, the support post 6 begins to slide along the guide 114 of the unloading station 64, from the connecting end 112 to the outlet 110. The lower end 116 of the guide 114 being at a distance from the contact surface with the ground smaller than the distance of the end segment 56 of the rods 52 of the cooperation member 50 of each support post 6 from the bearing surface of said post 6 on the ground, the support post 6 comes back into contact with the ground during its sliding along the guide 114.

Figure 8:
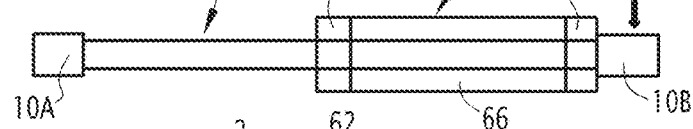

The trolley 4 is thus moved until it has passed the mooring 10B positioned closest to the foot of the conveyor 2, as shown in FIG. 8. Once the trolley 4 reaches this position, its movement along the elongation direction of the belt 8 is stopped. The wheels 84 positioned at the interface between the guide structure 66 and the unloading station 64 are then pivoted so as to be oriented substantially perpendicular to the elongation direction of the belt 8, then the unloading station 64 is moved transversely to the elongation direction of the belt 8, the loading station 62 remaining substantially immobile. The mooring 10B is moved at the same time as the unloading station 64. At the same time, the guides 94 and 114 are each pivoted so as to remain parallel to the elongation direction of the belt 8.

Figure 9:
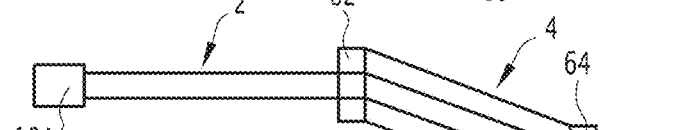

Once the unloading station 64 is transversely offset in the elongation direction of the belt 8 by a predetermined shift, as shown in FIG. 9, the movement of the unloading station 64 is stopped. The loading station 62 is then transversely offset from the first side of the unloading station 64 relative to the elongation direction of the conveyor belt 8.

The wheels 84 are then all pivoted so as to be reoriented substantially parallel to the elongation direction of the belt 8. Then, the movement of the trolley 4 parallel to the elongation direction of the belt 8 resumes, still toward the head of the conveyor 2. In so doing, the support posts 6 that touch the ground after having slid along the trolley 4 are transversely offset, relative to their original position, by a shift equal to the predetermined shift applied to the unloading station 64.

Figure 10:
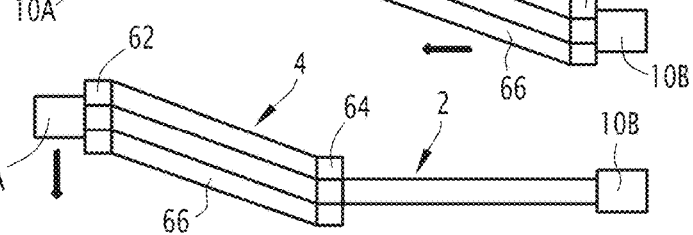

The trolley 4 is thus moved until the head of the conveyor 2 is engaged in the loading station 62, as shown in FIG. 10. Once the trolley 4 reaches this position, its movement parallel to the elongation direction of the belt 8 is stopped. The wheels 84 positioned at the interface between the guide structure 66 and the loading station 62 are then pivoted so as to be oriented substantially perpendicular to the elongation direction of the belt 8. Then, while the unloading station 64 remains substantially immobile, the loading station 62 is moved transversely to the elongation direction of the belt 8, in the same direction as the previous movement direction of the unloading station 64. The mooring 10A situated closest to the head of the conveyor 2 is moved at the same time as the loading station 62. At the same time, the guides 94 and 114 are each pivoted so as to remain parallel to the elongation direction of the belt 8.

Figure 11:
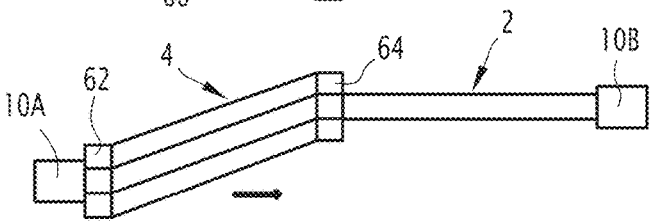

Once the loading station 62 is transversely offset by twice the predetermined shift previously applied to the unloading station, as shown in FIG. 11, the movement of the loading station 62 is stopped. The loading station 62 is then transversely offset from a second side of the unloading station 64 relative to the elongation direction of the conveyor belt 8.

The wheels 84 are then all pivoted so as to be reoriented substantially parallel to the elongation direction of the belt 8. Then, the movement of the trolley 4 parallel to the elongation direction of the belt 8 resumes, but this time toward the foot of the conveyor 2, i.e., in the direction opposite the movement direction previously applied. In so doing, the support posts 6 again slide on the trolley 4 no longer from the inlet 90 of the loading station 62 to the outlet 110 of the unloading station 64, but from the outlet 110 to the inlet 90. In particular, the support posts 6 are loaded on the trolley 4 at the unloading station 64, before being guided by the guide structure 66 to the loading station 62, then unloaded at the loading station 62.

The support posts 6 that then touch the ground after having slid along the trolley 4 are transversely offset, relative to their original position, by a shift equal to twice the predetermined shift applied to the unloading station 64.

Figure 12:
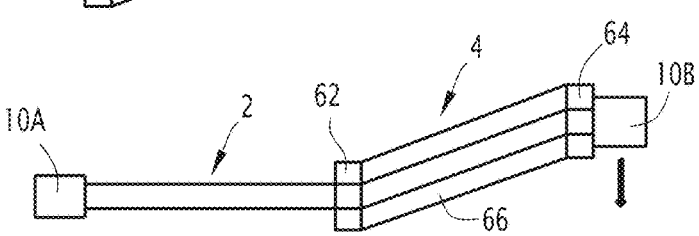

The trolley 4 is thus moved until the foot of the conveyor 2 is engaged in the unloading station 64, as shown in FIG. 12. Once the trolley 4 reaches this position, its movement parallel to the elongation direction of the belt 8 is stopped. The wheels 84 positioned at the interface between the guide structure 66 and the unloading station 64 are then pivoted so as to be oriented substantially perpendicular to the elongation direction of the belt 8. Then, while the loading station 62 remains substantially immobile, the unloading station 64 is moved transversely to the elongation direction of the belt 8, in the same direction as the previous movement direction. The mooring 10B is moved at the same time as the unloading station 64. At the same time, the guides 94 and 114 are each pivoted so as to remain parallel to the elongation direction of the belt 8.

Figure 13:
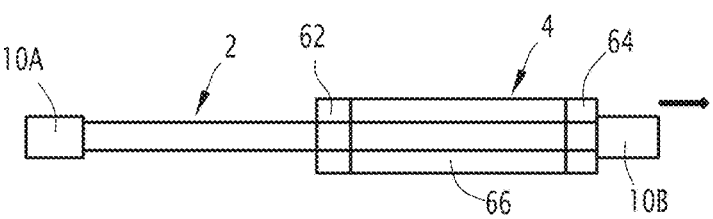

Once the unloading station 64 is transversely offset by the same predetermined shift as before, as shown in FIG. 13, the movement of the unloading station 64 is stopped. The support posts 6 are then all aligned with one another.

The wheels 84 are then all pivoted so as to be reoriented substantially parallel to the elongation direction of the belt 8, then the trolley 4 is moved along the elongation direction of the belt 8, so as to be freed from the conveyor 2. To that end, the trolley 2 is placed opposite the head of the conveyor 2, until all of the support posts 6 are unloaded from the trolley 4 and rest on the ground.

The movement of the facility 1 is then complete.

Owing to the invention described above, the movement of the moving facility 1 is done very easily. It is possible to offset the support posts 6 by a significant transverse shift upon each movement of the trolley 4 parallel to the elongation direction of the belt 8, which makes it possible to shift the conveyor 2 by the desired distance with a minimum number of movements of the trolley 4. The movable facility 1 can thus be moved more quickly than the existing movable facilities.

Furthermore, the movement of the movable facility 1 is done with minimal friction, since the posts 6 do not touch the ground during their movement, and they are only in contact with the trolley 4 along a reduced surface, in the case at hand the end segments 56 of the rods 52. The traction of the trolley 4 can therefore be done with a lower-powered vehicle.

Lastly, the trolley 4 allows the conveyor 2 to be able to continue operating during the movement of the movable facility 1, the weight of the ore transported by the conveyor 2 in fact being borne by the guide rails 130, 132, continuously. To that end, it suffices for the distance traveled by the support posts 6 during the transverse movement of the movable facility 1 to be less than or equal to 50 cm.

The invention claimed is:
1. A movable conveyor facility, comprising:
   a belt conveyor comprising:
      a set of independent support posts, suitable for resting on the ground and positioned successively along the length of the conveyor, each support post comprising:
         a frame defining a bearing surface of the post on the ground; and
         away from the bearing surface, a cooperation member for cooperating with a trolley for loading of the post on the trolley and guiding of the post by the trolley; and
      a conveyor belt supported by said support posts; and
   a trolley for transporting said belt conveyor, the trolley comprising:
      a loading station for loading said support posts on the trolley;
      an unloading station for unloading said support posts off the trolley;
      a guiding structure for guiding said support posts from said loading station to said unloading station; and
      means for moving the trolley along a movement direction forming an angle with an axis connecting said loading and unloading stations,
   wherein the distance of each cooperation member from the bearing surface is smaller than the distance of said guiding structure from a contact surface of the trolley with the ground.

2. The facility according to claim 1, wherein said loading station comprises a rectilinear guide to guide the support posts from an inlet of said loading station to said guiding structure, said rectilinear guide being suitable for being oriented substantially parallel to the movement direction during the movement of the trolley along the movement direction.

3. The facility according to claim 1, wherein said unloading station comprises a rectilinear guide to guide the support posts from said guiding structure toward an outlet of said unloading station, said rectilinear guide being suitable for being oriented substantially parallel to the movement direction during the movement of the trolley along the movement direction.

4. The facility according to claim 2, wherein said rectilinear guide of said loading station comprises two guide rails spaced transversely apart from one another relative to the guiding direction of said rectilinear guide, said rails defining a window between them emerging in a lower face of said loading station.

5. The facility according to claim 1, wherein the said guiding structure comprises two guide rails spaced transversely apart from one another relative to the guiding direction of said guiding structure, said rails defining between them a window emerging in a lower face of said guiding structure, each of said guide rails extending from said loading station to said unloading station.

6. The facility according to claim 1, wherein said means for moving comprise a set of wheels together defining a contact surface of the trolley with the ground, each wheel being mounted pivoting on the chassis of the trolley such that its orientation relative to the chassis can be changed, said wheels being suitable for being oriented parallel to one another along a same direction, said direction constituting the movement direction of the trolley.

7. The facility according to claim 6, wherein a first pair of wheels is positioned at the interface between said loading station and said guiding structure, and a second pair of wheels is positioned at the interface between said unloading station and said guiding structure.

8. The facility according to claim 7, wherein the wheels of each pair are mechanically connected to one another so as to be kept substantially parallel to one another.

9. The facility according to claim 1, wherein said belt conveyor comprises a filiform flexible line to which said support posts are connected.

10. The facility according to claim 1, wherein said cooperation member comprises at least two rods spaced apart from one another along an elongation direction of said conveyor belt, each rod being oriented transversely to the elongation direction.

11. A method for moving the facility according to claim 1, comprising the following steps:
- moving the trolley parallel to an elongation direction of said conveyor belt, in a first sense, said loading station being transversely offset on a first side of said unloading station relative to the elongation direction of said conveyor, belt;
- coming into contact of a support post of said belt conveyor with an inlet of said loading station;
- loading of the support post on the trolley, the support post being guided from the inlet of said loading station to said guiding structure;
- guiding of the support post from said loading station to said unloading station by said guiding structure; and
- unloading of said support post from the trolley, the support post being guided from said guiding structure to an outlet of said unloading station.

12. The movement method according to claim 11, comprising the following additional steps:
- moving said loading station along a direction transverse to the elongation direction of said conveyor belt, said unloading station remaining substantially immobile, until said loading station is transversely offset on a second side of said unloading station relative to the elongation direction of said conveyor belt;
- moving the trolley parallel to the elongation direction of said conveyor belt, in a second sense opposite the first sense;
- coming into contact of a support post of said belt conveyor with an outlet of the said unloading station;
- loading of the support post on the trolley, the support post being guided from the outlet of said unloading station to said guiding structure;
- guiding of the support post from said unloading station to said loading station by said guiding structure; and
- unloading of the support post from the trolley, the support post being guided from said guiding structure to an inlet of said loading station.

13. The facility according to claim 3, wherein said rectilinear guide of said unloading station comprises two guide rails spaced transversely apart from one another relative to the guiding direction of said rectilinear guide, said guide rails defining a window between them emerging in a lower face of said unloading station.

* * * * *